United States Patent
Klotsche et al.

(10) Patent No.: US 7,653,347 B2
(45) Date of Patent: Jan. 26, 2010

(54) DOPPLER COMPENSATION CONTROL FOR RADIO TRANSMISSION

(75) Inventors: Ralf Klotsche, Neuenbürg (DE); Klaus Wünstel, Schwieberdingen (DE); Thomas-Rolf Banniza, Schwieberdingen (DE)

(73) Assignee: Alcatel Lucent, Paris (FR)

( * ) Notice: Subject to any disclaimer, the term of this patent is extended or adjusted under 35 U.S.C. 154(b) by 619 days.

(21) Appl. No.: 11/636,984

(22) Filed: Dec. 12, 2006

(65) Prior Publication Data

US 2007/0197165 A1 Aug. 23, 2007

(30) Foreign Application Priority Data

Feb. 20, 2006 (EP) .................................. 06300147

(51) Int. Cl.
*H04B 1/60* (2006.01)
(52) U.S. Cl. .................. 455/10; 455/63.1; 455/506; 455/65; 455/67.16; 342/418; 342/171; 375/341
(58) Field of Classification Search ............... 455/10, 455/63.1, 506, 65, 67, 16, 504; 342/418, 342/171, 113, 146; 375/341, 316
See application file for complete search history.

(56) References Cited

U.S. PATENT DOCUMENTS

| | | | | |
|---|---|---|---|---|
| 3,665,443 A * | 5/1972 | Galvin | .................. | 367/94 |
| 4,187,491 A * | 2/1980 | Lindstrum et al. | .......... | 367/125 |
| 4,353,068 A * | 10/1982 | Fernandez | .................. | 342/174 |
| 4,580,249 A * | 4/1986 | Magee et al. | .................. | 367/94 |
| 4,713,664 A * | 12/1987 | Taylor, Jr. | .................. | 342/91 |
| 5,072,196 A * | 12/1991 | Rousselet et al. | .......... | 331/12 |
| 5,371,718 A * | 12/1994 | Ikeda et al. | .................. | 367/91 |
| 5,471,648 A * | 11/1995 | Gourgue | .................. | 455/63.1 |
| 5,581,237 A * | 12/1996 | DiPoala | .................. | 340/554 |
| 5,703,595 A * | 12/1997 | Tayloe et al. | ............. | 342/175 |
| 5,809,087 A * | 9/1998 | Ashe et al. | .................. | 375/340 |
| 5,854,605 A * | 12/1998 | Gildea | .................. | 342/357.03 |
| 6,025,795 A * | 2/2000 | Hulderman et al. | .......... | 342/45 |
| 6,366,762 B1 * | 4/2002 | Miller et al. | ............. | 455/67.16 |
| 6,473,594 B1 * | 10/2002 | Piirainen | .................. | 455/63.1 |
| 6,628,724 B2 * | 9/2003 | Bannasch et al. | .......... | 375/259 |
| 6,909,738 B2 * | 6/2005 | Akopian et al. | .......... | 375/142 |
| 6,965,753 B1 * | 11/2005 | Miller et al. | ............. | 455/12.1 |

(Continued)

FOREIGN PATENT DOCUMENTS

EP 1 041 738 A 10/2000

(Continued)

*Primary Examiner*—Minh D Dao
(74) *Attorney, Agent, or Firm*—Fay Sharpe LLP

(57) ABSTRACT

A Doppler compensation method is used for radio transmission between a mobile body possibly but not exclusively a train and some base station, both mobile body and base station comprise respectively a transceiver connected to an antenna for the radio transmission. The method comprises the step of determining the direction of motion of the mobile body with respect to the active base station i.e. the base station to which a radio transmission link is just built. The method is then followed by the step to apply a constant Doppler compensation corresponding to the cancellation of the Doppler effect for a mobile body moving in the same direction at predefined limiting speed of motion ($v_{limit}$) at which a quality threshold is reached with the used radio transmission technology in the case without a Doppler compensation.

14 Claims, 4 Drawing Sheets

U.S. PATENT DOCUMENTS

| | | | |
|---|---|---|---|
| 6,999,724 B2* | 2/2006 | Chizhik et al. | 455/63.1 |
| 7,006,034 B1* | 2/2006 | Krikorian et al. | 342/159 |
| 7,142,562 B2* | 11/2006 | Yavuz et al. | 370/468 |
| 7,224,721 B2* | 5/2007 | Betz et al. | 375/152 |
| 7,299,013 B2* | 11/2007 | Rotta et al. | 455/67.16 |
| 7,385,934 B2* | 6/2008 | Uehara et al. | 370/252 |
| 7,439,906 B1* | 10/2008 | Blunt et al. | 342/195 |
| 2001/0055352 A1* | 12/2001 | Bannasch et al. | 375/348 |
| 2003/0053412 A1* | 3/2003 | Yoshida et al. | 370/208 |
| 2004/0001462 A1* | 1/2004 | Yavuz et al. | 370/333 |
| 2004/0248519 A1 | 12/2004 | Niemela | |
| 2005/0128976 A1* | 6/2005 | Uehara et al. | 370/329 |
| 2006/0170589 A1* | 8/2006 | Park et al. | 342/357.02 |
| 2007/0067073 A1* | 3/2007 | Hsu et al. | 701/13 |
| 2008/0171515 A1* | 7/2008 | Kim et al. | 455/63.1 |
| 2009/0003617 A1* | 1/2009 | Goldman et al. | 381/71.12 |
| 2009/0012398 A1* | 1/2009 | Zhang et al. | 600/453 |
| 2009/0036144 A1* | 2/2009 | Wong et al. | 455/456.3 |

FOREIGN PATENT DOCUMENTS

EP        1 460 780 A        9/2004

* cited by examiner

DOPPLER COMPENSATION CONTROL FOR RADIO TRANSMISSION

The invention is based on a priority application EP 06300147.3 which is hereby incorporated by reference.

TECHNICAL FIELD

The present invention relates to a Doppler compensation method for radio transmission between a mobile body and a base station while the direction of motion of the mobile body is determined with respect to the active base station. Furthermore, it is related to a radio frequency device for performing radio transmission between the mobile body and the base station. It is also related to a base station as well as a mobile body, each comprising such a radio frequency device for setting up a radio transmission between them.

BACKGROUND OF THE INVENTION

It is well known that the frequency spectrum of a radio transmission between a moving vehicle (mobile body) and a base station fixed to the ground undergoes some variations coming from the Doppler effect. Such an effect corresponds to a phase noise that the electromagnetic waves from such radio link are subjected to when the direction of motion of the mobile body is parallel to the direction of the propagating electromagnetic wave. This phase noise or signal fading can be usually neglected for actually used radio transmission techniques based on frequency channels well separated (see GSM or even UMTS).

But this situation may no more be the case for techniques based on multicarrier transmission trying to use its full capacity. This is typically the case for e.g. Orthogonal Frequency Division Multiplexing (OFDM), the technique used for radio transmission compatible to the IEEE standard 802.16 also known under the acronym Worldwide Interoperability for Microwave Access WIMAX which seems today one of the most promising technology under discussion for bidirectional communication to mobiles. For such technologies, the sensitivity to the Doppler effect may no more be so negligible since the frequency channels are chosen with a very narrow frequency spacing. For example, at OFDM the frequency spacing is arranged so as to null the correlation between a modulation band signal transmitted by a nth subcarrier of multicarrier transmission and a modulation band signal transmitted by a (n+1)th subcarrier.

In accordance with OFDM, the frequency assignment with overlapping bands becomes possible, thereby enabling an improvement in the spectrum efficiency. OFDM is different from other multicarrier transmission schemes that modulate theirs carriers independently, and since modulation/demodulation is performed at a stroke by a Fast Fourier Transform (FFT), an orthogonal relationship is established among the carriers. Further, by adding on a guard interval signal on the transmitting side, it is possible to eliminate inter-symbol interference caused by multipath delay. If an IFFT output signal conforming to one OFDM symbol is adopted as one unit, insertion of the guard interval signifies copying the tail-end portion of the signal to the leading end thereof. Thus, with OFDM, multipath equalization basically is unnecessary. However, in order to avoid causing a decline in performance, a guard interval that is larger than the maximum delay time of multipath envisioned in the system must be set in such a manner that inter-symbol interference will not occur. Though inserting the guard interval makes it possible to eliminate the influence of interference caused by multipath, a tradeoff is involved in that the guard interval diminishes transmission efficiency at the same time. In order to mitigate the decline in transmission efficiency, it is necessary to make the OFDM symbol duration as large as possible, i.e. to make the guard ratio as small as possible. From this viewpoint, the carrier spacing in the given bandwidth should be made small, i.e., the number of carriers should be increased.

However, due to fading, the received signal varies not only along the time direction but also along the frequency direction, latter one being the Doppler shift. Doppler shift which is directly proportional to the speed of motion of the mobile body is produced in the range of maximum Doppler frequency. If the carrier spacing is small, this variation is greater than one carrier and carrier synchronization on the receiving side is difficult. As a consequence, frequency-selective fading, in which the variation sustained differs depending upon the frequency, occurs and the performance at the receiver is degraded. The reason for this is that inter-carrier interference occurs because frequency fluctuation is independent from carrier to carrier (or more specifically, from carrier group to carrier group within the coherence bandwidth). In order to suppress the degradation of performance caused by that interference, it is necessary to make the carrier spacing as large as possible. Thus, there is a tradeoff with regard to transmission efficiency.

In EP1 460 780 B1 is described an antenna apparatus capable of being installed at a mobile body, the antenna apparatus comprising a plurality of receiving antenna. These antenna are controlled by an antenna switches for switching each of the plurality of receiving antennas between a connected and a disconnected state respectively. An information processing circuit controls that switches based on direction and speed at which the vehicle moves relative to direction of propagation of the received signal. This information is determined from the known position of the broadcast station and the current vehicle position derived from e.g. GPS. It allows to inhibit Doppler effect when a vehicle receives an OFDM signal, and hence allows good reception even when the vehicle is moving by controlling the switching of antennas based on likely occurrence of Doppler effects rather than signal level, which is not necessarily different between antennas.

For IEEE 802.16 standard which is today one of the favorite technologies under discussion for bidirectional communication to mobiles (mobile body) the following estimations apply: up to 100 km/h negligible influence; up to 200 km/h slight degradation of signal quality, but can still be tolerated; beyond 200 km/h the effect becomes more and more important and decreases signal quality significantly. At 400 km/h which is the target speed for modern long distance trains, a Doppler compensation is absolutely required. Such a picture may be worse i.e. the speed limit beyond which the Doppler effect becomes more and more important may be less when the used technology is based on a smaller frequency channel spacing to increase transmission capacity.

SUMMARY OF THE INVENTION

In view of the above, it is an object of the present invention to find a cost effective and robust solution for a Doppler compensation on a radio transmission between a mobile body and a base station.

This object is achieved in accordance with the invention by a Doppler compensation method for radio transmission between a mobile body possibly but not exclusively a train and some base station, both mobile body and base station comprise respectively a transceiver connected to an antenna for the radio transmission. The method comprises the step of determining the direction of motion of the mobile body with respect to the active base station i.e. the base station to which a radio transmission link is just built. The method is then followed by the step to apply a constant Doppler compensation corresponding to the cancellation of the Doppler effect for a mobile body moving in the same direction at predefined limiting speed of motion ($v_{limit}$) at which a quality threshold is reached with the used radio transmission technology.

In some implementation of the Doppler compensation method according to the invention, the applied constant Doppler compensation is increased preferably step wise. This depends on the used radio transmission technology fixing the quality threshold and thus the predefined limiting speed of motion ($v_{limit}$). The value of the Doppler compensation is increased when the speed of motion of the mobile body exceeds the double of the limiting speed of motion defining the applied constant Doppler compensation. In that case, the applied constant Doppler compensation is increased such to correspond to the cancellation of the Doppler effect for a mobile body moving in the same direction at limiting speed of motion at which the predefined quality threshold is reached with the used radio transmission technology, that limiting speed of motion being equal to $(2*n+1)$ the initial predefined limiting speed $v_{limit}$ with n being an incremental index for the times the speed exceeded $2*n*v_{limit}$, the limiting speed defining the applied constant Doppler compensation. The change of the Doppler compensation is reversible and follows a symmetric law i.e. each time the speed of motion of the mobile device falls below the double of the limiting speed of motion then the constant Doppler compensation is decreased by the same fixed amount as it was increased in a previous step.

In some advantageous implementation according to the invention, the change of the applied constant Doppler compensation follows some hysteresis law for avoiding an instable regime when the speed of motion of the mobile body is close to the double of the limiting speed. Such hysteresis law can be defined such that the constant Doppler compensation is increased when the speed of motion exceeds a maximum speed of motion ($v_{max}$) while it is decreased when the speed of motion of the mobile body falls below a minimum speed of motion ($v_{min}$), both maximum and minimum speed of motion being defined according to the limiting speed ($v_{limit}$) such that $v_{min} > v_{limit} > v_{max}$.

In an alternative implementation according to the invention, the applied Doppler compensation is performed at reception of a signal transmitted via that radio transmission between the mobile body and the base station. In another alternative implementation, the applied Doppler compensation is performed at transmission side before transmitting a signal via that radio transmission between the mobile body and the base station.

The invention further relates to a radio frequency device for performing radio transmission between a mobile body and a base station while the radio frequency device comprises a transceiver connected to an antenna and a decision unit determining the direction of motion of the mobile body with respect to the active base station, that decision unit activating some Doppler compensation unit for applying some Doppler compensation on the radio transmission. Latter takes the form of a constant Doppler compensation independently the speed of motion of the mobile body. That constant Doppler compensation corresponds to the cancellation of the Doppler effect for a mobile body moving in the same direction at predefined limiting speed of motion ($v_{limit}$) at which a quality threshold is reached with the used radio transmission technology.

In a specific embodiment according to the invention and the used radio transmission technology, in the case the speed of motion of the mobile body exceeds the double of the limiting speed of motion defining the applied constant Doppler compensation then the decision unit activates the Doppler compensation unit such that the applied constant Doppler compensation is increased to correspond to the cancellation of the Doppler effect for a mobile body moving in the same direction at limiting speed of motion at which the predefined quality threshold is reached with the used radio transmission technology, that limiting speed of motion being equal to $(2*n+1)$ the initial predefined limiting speed $v_{limit}$ with n being an incremental index for the times the speed exceeded the double limiting speed defining the applied constant Doppler compensation. A symmetric behavior is applied in the case the speed of motion of the mobile device falls below the double of the limiting speed of motion defining the applied constant Doppler compensation. In such a case, the decision unit activates the Doppler compensation unit to decrease the applied constant Doppler compensation about the same fixed amount. Such a change of the applied constant Doppler compensation can be performed following some hysteresis law for avoiding an instable regime when the speed of motion of the mobile body is close to the double of the limiting speed.

In an alternative embodiment according to the invention, the radio frequency device is used at reception side by activating the Doppler compensation unit on signal transmitted via that radio transmission between the mobile body and the base station. In an other alternative embodiment, the radio frequency device is used at transmission side by activating the Doppler compensation unit on signal to be transmitted via that radio transmission between the mobile body and the base station.

Advantageously, all the embodiments according to the invention are defined such that there are particularly adapted for a base station and/or a mobile body, the base station being in connection via radio transmission with a mobile body moving at some given speed and direction with respect to the base station. In particularly, such base station and/or mobile body comprise a radio frequency device according to the invention applying the Doppler compensation method at reception and/or transmission side.

Advantageous developments of the invention are described in the dependent claims, the following description and the drawings.

BRIEF DESCRIPTION OF THE DRAWINGS

An exemplary embodiment of the invention will now be explained further with the reference to the attached drawings in which.

DETAILED DESCRIPTION OF PREFERRED EMBODIMENTS

In mobile communications there are several different effects causing a signal degradation, the Doppler effect is only one of them. All effects are summarized in the so called "link budget" and can be treated together as noise. Noise, or more precise the signal to noise ratio, causes limitations of a radio transmission system and has to be considered in the balance of data throughput, bit error rates, forward error correction overhead, coverage, transmission power, and last not least travelling speed. Within the limits given by the used radio technology (e.g. WiMAX) a certain Doppler shift is acceptable up to a certain speed limit $v_{limit}$ of motion of the mobile body with respect to the antenna of the base station. Above that limit, the noise of the radio transmission exceeds a quality threshold which defines the tolerable limit. When the noise exceeds that limit then the radio transmission is noticeable too bad. The frequency shift caused by the Doppler effect increases almost linearly with the speed of motion between the sender and the transmitter and causes an increasing quality degradation of the OFDM signals. For WiMAX such speed limit shall be set at about 200 km/h. As long as such loss is considered as tolerable, it is not necessary to compensate the Doppler shift below such a speed of motion of the mobile body. By applying a constant Doppler compensation according to the invention based on the speed limit $v_{limit}$, the radio technology can possibly cope with a relative speed of up to $2 \times v_{limit}$ because the receiver in the vehicle (mobile body) 'sees' a speed variation from $-v_{limit}$ to $+v_{limit}$ which the radio technology can cope with.

Figure 1:
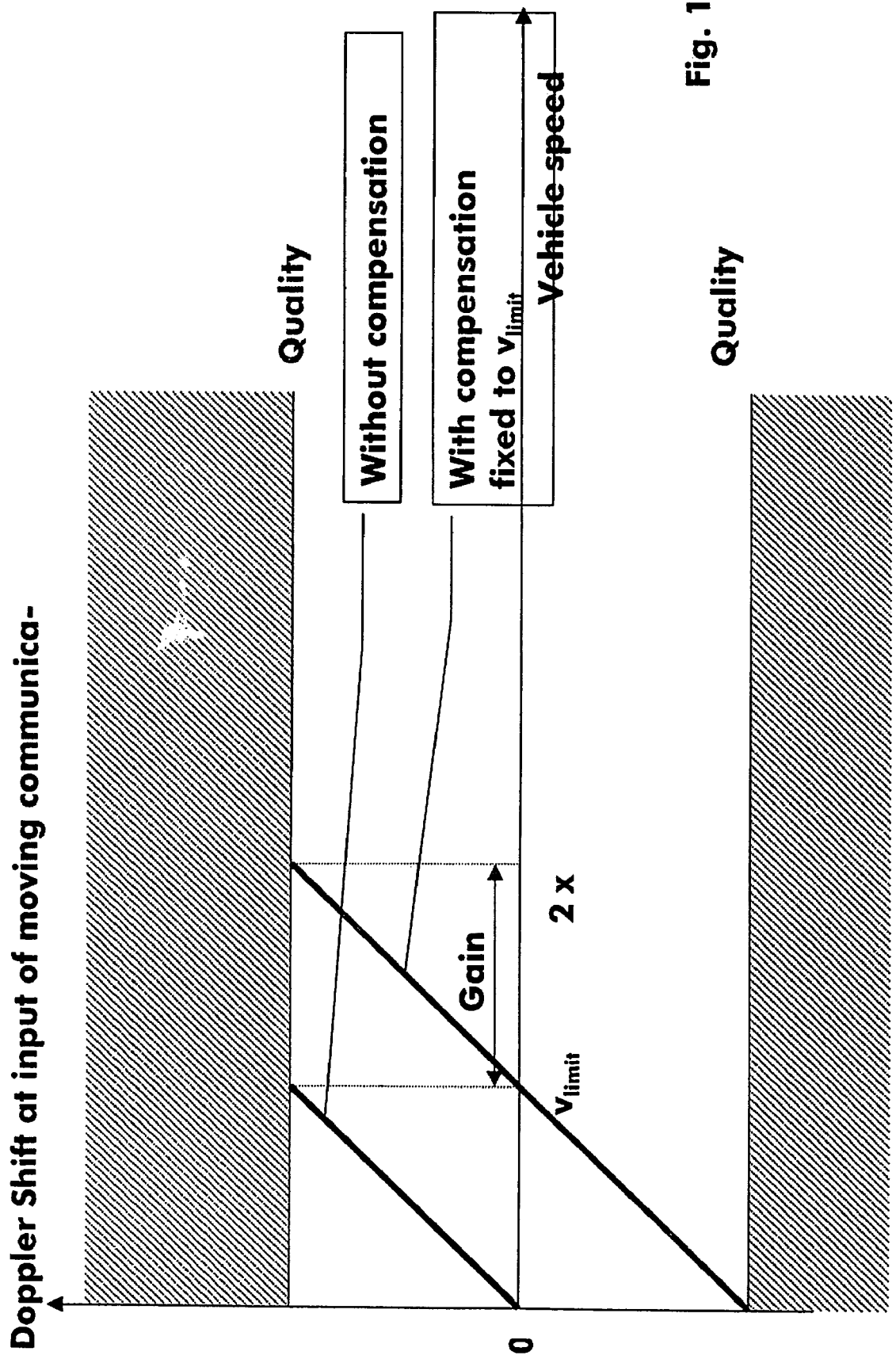
FIG. 1 is a graphic of the Doppler shift with respect to the speed of the mobile body without and with the compensation according to the present invention.

On FIG. 1 is shown a graph of the Doppler shift according to the relative speed of motion between the mobile body and the antenna of the base station (active) involved in the radio transmission link. The Doppler shift is tolerable for a Doppler shift value being within an interval defined by the absolute value of the quality threshold. Without Doppler compensation, the Doppler shift reaches the threshold value at some speed of motion defined in the following as the limiting speed of motion $v_{limit}$. That value depends mostly on the radio transmission technology. When a constant Doppler compensation is applied to the radio transmission then the linear behavior of the Doppler shift at the input of the moving communication device (mobile body) is shifted of a specific amount $v_{limit}$. This speed limit is the value used to calculate the applied constant Doppler compensation corresponding to the cancellation of the Doppler effect for a mobile body moving at that speed limit $v_{limit}$ and in the same direction as the moving communication device. It is clear from FIG. 1 that with the applied constant Doppler compensation, the Doppler shift reaches the quality threshold at $2 \times v_{limit}$. For the example of Wimax, it would be 400 km/h, a range covering well e.g. the speed of future modern fast trains.

Figure 2:
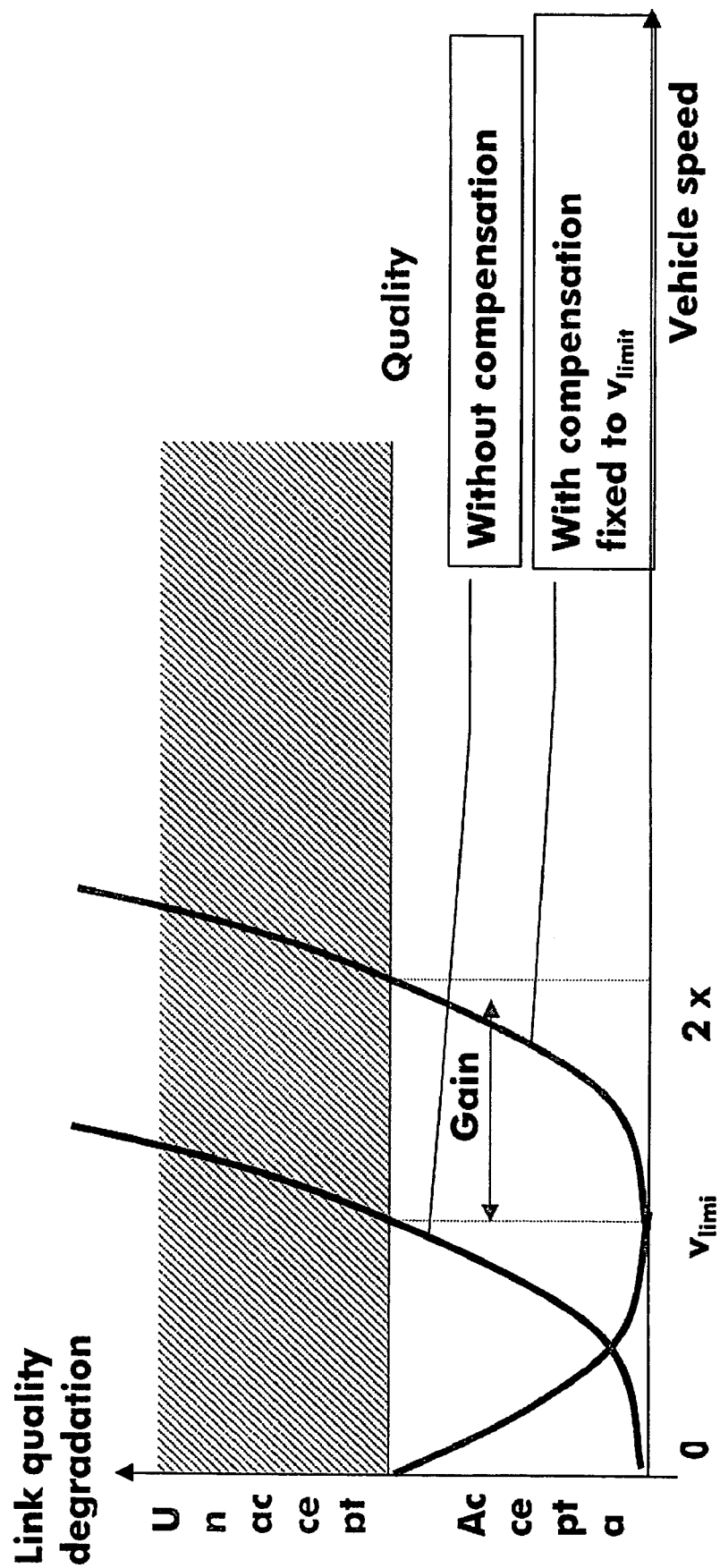
FIG. 2 is a graphic of the link quality degradation with respect to the speed of the mobile body without and with the compensation according to the present invention.

On FIG. 2 is shown a comparison of the link quality degradation according to the vehicle speed (speed of the mobile body versus the antenna of the active antenna) between the situation without Doppler compensation and the case with applied constant Doppler compensation. The link quality degradation with an applied constant Doppler compensation is shifted in the same way as for the Doppler shift curve on FIG. 1. This shows clearly that a real gain is achieved increasing the tolerable speed interval from $[0, v_{limit}]$ to $[0, 2 \times v_{limit}]$.

It is also possible that another radio transmission technology imposes a $v_{limit}$ noticeable less than 200 km/h which could be around 50 km/h. In that case, the use of a constant Doppler compensation defined by that $v_{limit}$ would give a speed interval for a tolerable radio link of $[0, 2 \times v_{limit}]$, i.e. till 100 km/h as a upmost speed of motion for the mobile device. This would not be enough even for normal train. Alternatively, if Wimax would be further developed to be applicable for airplane, it is clear that the speed interval to 400 km/h would not cover the entire speed range of such mobile device. For that situation and according to the invention, the Doppler compensation can be switched to a compensation based on a speed of about $(2 \times n+1) \times v_{limit}$, which would allow a movement of the vehicle in the speed range of $[2 \times n \times v_{limit}, (2 \times n+1) \times v_{limit}]$. The incremental index n corresponds to the time the speed exceeded $2 \ast n \ast v_{limit}$, the limiting speed defining the applied constant Doppler compensation. In such a way and according to the invention, some constant Doppler compensation will be applied to a mobile device starting at 0 km/h, that constant Doppler compensation defined by $v_{limit}$ being applied till the mobile device exceeds the speed limit $2 \times v_{limit}$ with n=1. Afterwards, a new constant Doppler compensation is applied which is now defined by the speed limit $(2 \times n+1) \times v_{limit}$ with n=1 i.e. $3 \times v_{limit}$. And if the mobile device accelerate further till to exceed the speed limit $4 \times v_{limit}$ (n=2) then a constant Doppler compensation defined by $3 \times v_{limit}$ will be applied.

Figure 3:
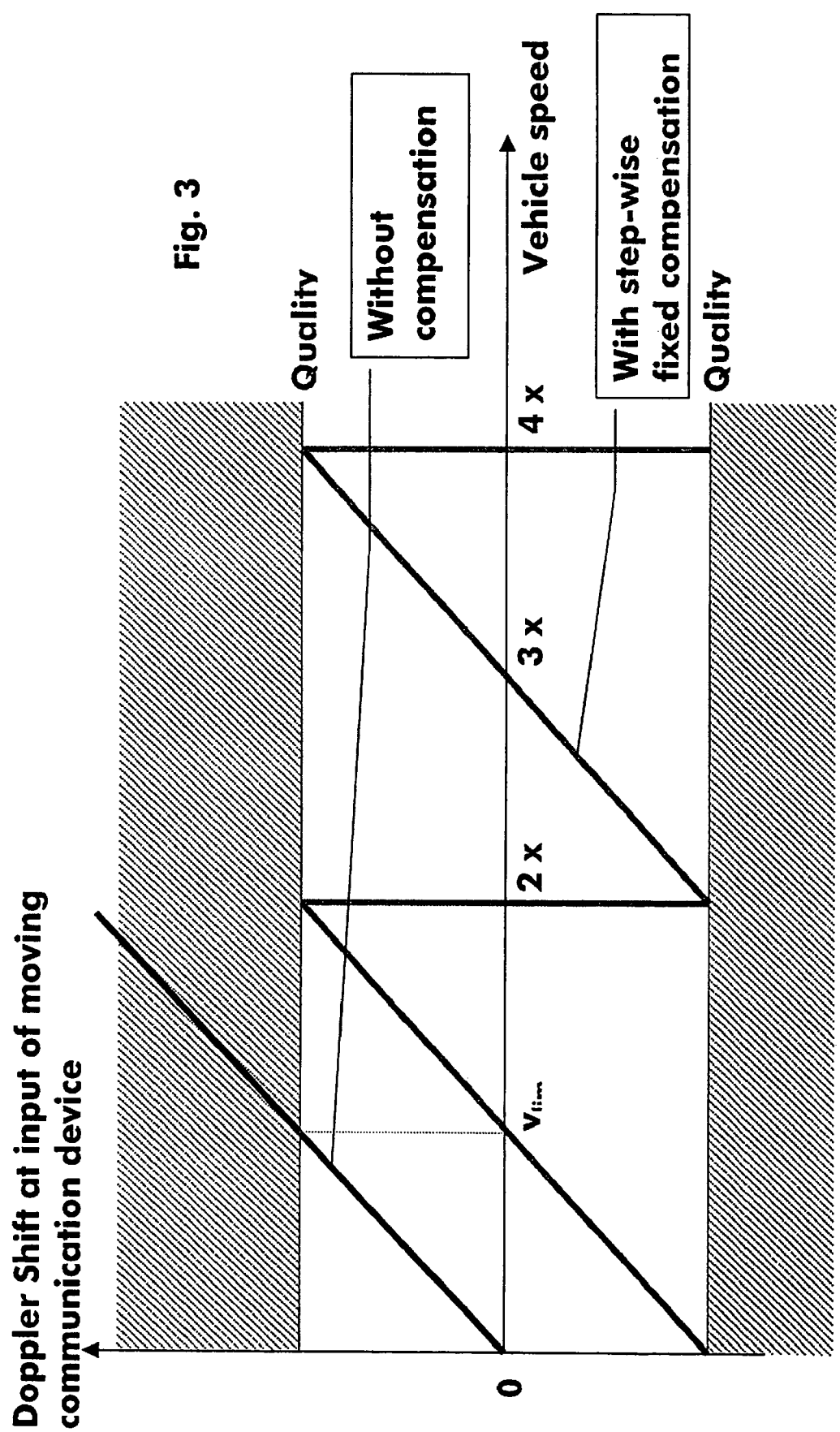
FIG. 3 is a graphic of the Doppler shift with respect to the speed of the mobile body according to an alternative of the present invention.
Figure 4:
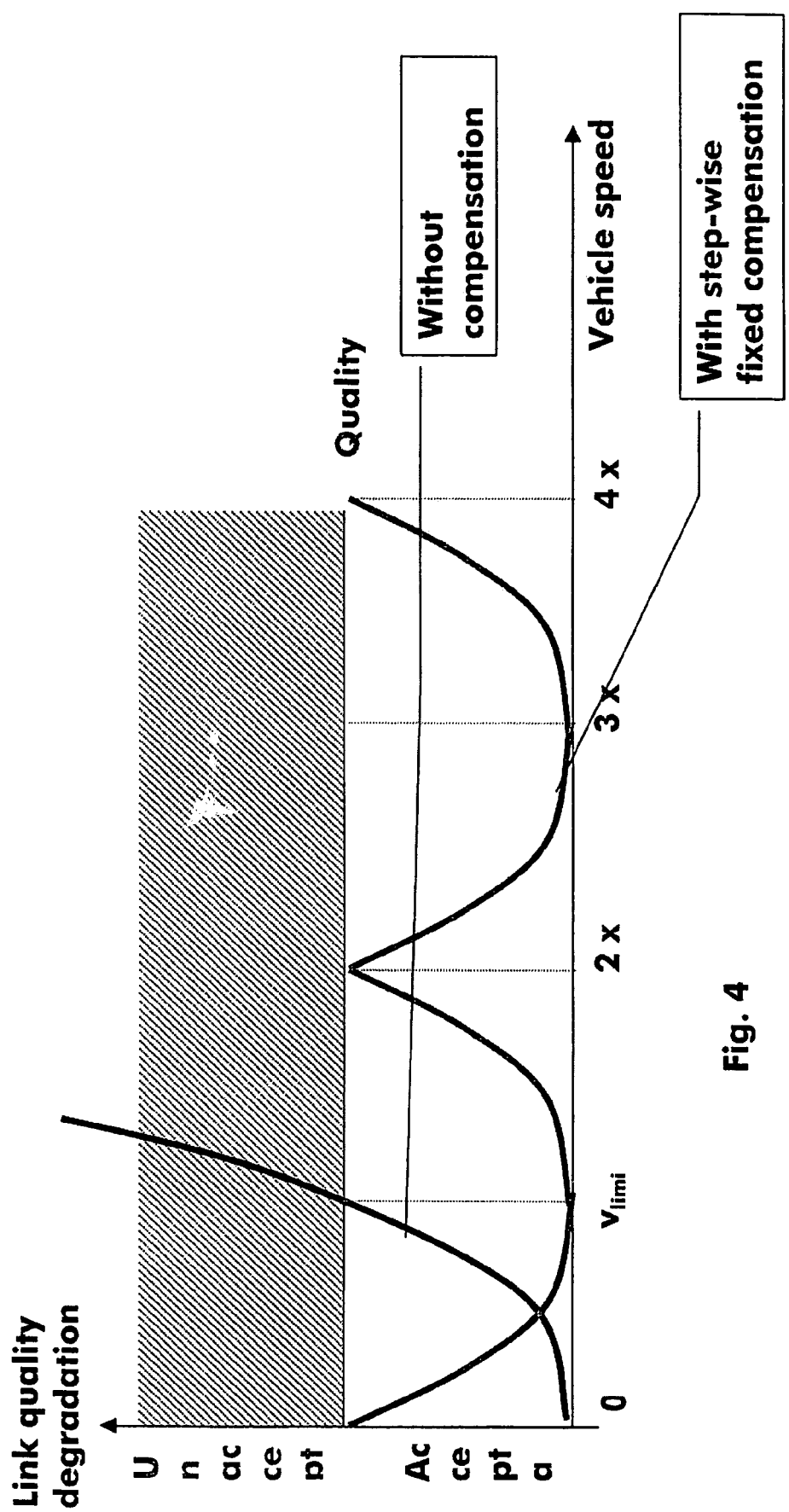
FIG. 4 is a graphic of the link quality degradation with respect to the speed of the mobile body according to the alternative from FIG. 3.

Such behavior is reflected in some sawtooth behavior after compensation as shown on FIG. 3. There is pictured a graph of the Doppler shift according to the vehicle speed while over a range up to $4 \times v_{limit}$. A step-wise constant (fixed) Doppler compensation is applied according to the law defined just above. On FIG. 4 is shown the corresponding graph for the link quality degradation. As for the case where the Doppler compensation is maintain constant for the whole speed range, it is here also possible to take into account some similar hysteresis law before changing the applied constant Doppler compensation. This is usually necessary for a stable regime i.e. a smooth transition without to fast fallback cases when the mobile device is moving just close to the speed of $(2 \times n+1) \times v_{limit}$.

According to an embodiment of the invention, the Doppler compensation can be performed at reception of the signal transmitted via the radio transmission link between the mobile body and the base station. This is possible at the mobile body side as well as at the base station side. According to an alternative embodiment of the invention, the Doppler compensation can be performed before transmitting the signal i.e. before the Doppler effect affected the signal to be transmitted through the radio link. Also in this case, it is possible to applied such procedure at the mobile as well as at the body side.

The mobile body and/or the base station comprise a radio frequency device for performing radio transmission with an active base station while the radio frequency device comprises a transceiver connected to an antenna and a decision unit determining the direction of motion of the mobile body with respect to the active base station. It is that decision unit which activates some Doppler compensation unit for applying the appropriate constant Doppler compensation on the radio transmission.

According to the invention, devices like close loop control for exact Doppler effect compensation can be avoided. Instead, it allows to work with a fixed frequency clock base for the sampling circuits. This reduces substantially the effort to be spent for the realization of Doppler effect compensation.

The invention claimed is:

1. A Doppler compensation method for radio transmission between a mobile body and a base station, the method comprises the following step of:

Determining the direction of motion of the mobile body with respect to the active base station;

The method being further wherein the step of

Applying a constant Doppler compensation corresponding to the cancellation of the Doppler effect for a mobile body moving in the same direction at predefined limiting speed of motion ($v_{limit}$) at which a quality threshold is reached with the used radio transmission technology in the case without any Doppler compensation.

2. The method according to the claim 1 wherein each time n the speed of motion of the mobile body exceeds the double of the limiting speed of motion defining the applied constant Doppler compensation then is increased the applied constant Doppler compensation about a fixed amount such that the newly applied constant Doppler compensation corresponds to the cancellation of the Doppler effect for a mobile body moving in the some direction at a limiting speed of motion at which the predefined quality threshold is reached, that limiting speed of motion being equal to (2*n+1) the initial predefined limiting speed $v_{limit}$.

3. The method according to claim 2 wherein the change of the applied constant Doppler compensation is reversible and follows a symmetric law such that each time the speed of motion of the mobile body falls below the double of the limiting speed of motion defining the applied constant Doppler compensation then is decreased the applied constant Doppler compensation about the same fixed amount.

4. The method according to claim 2 wherein the change of the applied constant Doppler compensation follows some hysteresis law for avoiding an instable regime when the speed of motion of the mobile body is close to the double of the limiting speed.

5. The method according to claim 1 wherein the applied Doppler compensation is performed at reception of a signal transmitted via that radio transmission between the mobile body and the base station.

6. The method according to claim 1 wherein the applied Doppler compensation is performed at transmission side before transmitting a signal via that radio transmission between the mobile body and the base station.

7. The radio frequency device according to claim 6 wherein it is used at reception side by activating the Doppler compensation unit on signal transmitted via that radio transmission between the mobile body and the base station.

8. The radio frequency device according to claim 6 wherein it is used at transmission side by activating the Doppler compensation unit on signal to be transmitted via that radio transmission between the mobile body and the base station.

9. A base station to be in connection via radio transmission with a mobile body moving at some given speed with respect to the base station while the base station comprises a radio frequency device according to claim 6.

10. A mobile body to be in connection with a base station via radio transmission and moving at some given speed with respect to the base station while the mobile body comprises a radio frequency device according to claim 6.

11. A radio frequency device for performing radio transmission between a mobile body and a base station while the radio frequency device comprises a transceiver connected to an antenna and a decision unit determining the direction of motion of the mobile body with respect to the active base station, that decision unit activating some Doppler compensation unit for applying some Doppler compensation on the radio transmission, the radio frequency device is wherein the Doppler compensation unit applies a constant Doppler compensation corresponding to the cancellation of the Doppler effect for a mobile body moving in the same direction at predefined limiting speed of motion ($v_{limit}$) at which a quality threshold is reached with the used radio transmission technology in the case without any Doppler compensation.

12. The radio frequency device according to the claim 11 wherein each time n the speed of motion of the mobile body exceeds the double of the limiting speed of motion defining the applied constant Doppler compensation then the decision unit activates the Doppler compensation unit such that the applied constant Doppler compensation is increased about a fixed amount such that the newly applied Doppler compensation corresponds to the cancellation of the Doppler effect for a mobile body moving in the some direction at limiting speed of motion at which the predefined quality threshold is reached with the used radio transmission technology, that limiting speed of motion being equal to (2*n+1) the initial predefined limiting speed $v_{limit}$.

13. The radio frequency device according to claim 11 wherein the decision unit activates the Doppler compensation unit following a symmetric way such that each time the speed of motion of the mobile device falls below the double of the limiting speed of the motion defining the applied constant Doppler compensation then is decreased the applied constant Doppler compensation about the same fixed amount.

14. The radio frequency device according to claim 11 wherein the decision unit activates the Doppler compensation unit following some hysteresis law for avoiding an instable regime when the speed of motion of the mobile body is close to the double of the limiting speed.

* * * * *

UNITED STATES PATENT AND TRADEMARK OFFICE
CERTIFICATE OF CORRECTION

PATENT NO. : 7,653,347 B2  Page 1 of 1
APPLICATION NO. : 11/636984
DATED : January 26, 2010
INVENTOR(S) : Klotsche et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Twenty-eighth Day of December, 2010

David J. Kappos
*Director of the United States Patent and Trademark Office*